US012623654B2

(12) United States Patent
Haruta et al.

(10) Patent No.: US 12,623,654 B2

(45) Date of Patent: May 12, 2026

(54) PROCESSING METHOD, PROCESSING SYSTEM AND STORAGE MEDIUM FOR STORING PROCESSING PROGRAM FOR PLANNING DRIVING CONTROL FROM A HOST LANE TO AN ONCOMING LANE

(71) Applicant: DENSO CORPORATION, Kariya-city (JP)

(72) Inventors: Keisuke Haruta, Tokyo (JP); Sadahiro Terazawa, Tokyo (JP)

(73) Assignee: DENSO CORPORATION, Kariya-city (JP)

(*) Notice: Subject to any disclaimer, the term of this patent is extended or adjusted under 35 U.S.C. 154(b) by 144 days.

(21) Appl. No.: 18/512,986

(22) Filed: Nov. 17, 2023

(65) Prior Publication Data

US 2024/0083419 A1    Mar. 14, 2024

Related U.S. Application Data

(63) Continuation of application No. PCT/JP2022/018844, filed on Apr. 26, 2022.

(30) Foreign Application Priority Data

May 21, 2021    (JP) ................................. 2021-086370

(51) Int. Cl.
B60W 30/09         (2012.01)
B60W 30/095        (2012.01)
          (Continued)

(52) U.S. Cl.
CPC ........ B60W 30/09 (2013.01); B60W 30/0956 (2013.01); B60W 30/12 (2013.01);
          (Continued)

(58) Field of Classification Search
CPC .. B60W 30/09; B60W 30/0956; B60W 30/12; B60W 30/18163; B60W 40/109;
          (Continued)

(56) References Cited

U.S. PATENT DOCUMENTS

2015/0224926 A1*    8/2015    Mochizuki ........... G06V 20/588
                                                    701/36
2016/0281621 A1     9/2016    Nakade et al.
          (Continued)

FOREIGN PATENT DOCUMENTS

JP        2009-096349 A      5/2009
JP        2010-260473 A     11/2010
WO        2018/115963 A2     6/2018

*Primary Examiner* — Jason Holloway

(74) *Attorney, Agent, or Firm* — Precision Patents, P.C.

(57)          ABSTRACT

A processing method implemented by a host mobile object includes steps of: monitoring a target mobile object traveling in an oncoming lane; and upon determining that the target mobile object traveling in the oncoming lane is detected, selecting, as driving control given to the host mobile object according to an overlapping travel situation where a future travel of the host mobile object and a future travel of the target mobile object would overlap with each other in the oncoming lane, either (i) deviation control for the host mobile object to deviate from the host lane to the oncoming lane or (ii) standby control for the host mobile object to stay in the host lane.

10 Claims, 18 Drawing Sheets

(51) Int. Cl.
  *B60W 30/12* (2020.01)
  *B60W 30/18* (2012.01)
  *B60W 40/109* (2012.01)
  *B60W 50/00* (2006.01)

(52) U.S. Cl.
  CPC .... *B60W 30/18163* (2013.01); *B60W 40/109* (2013.01); *B60W 50/0097* (2013.01); *B60W 2520/125* (2013.01); *B60W 2554/4042* (2020.02)

(58) Field of Classification Search
  CPC ....... B60W 50/0097; B60W 2520/125; B60W 2554/4042; G08G 1/16
  See application file for complete search history.

(56) References Cited

U.S. PATENT DOCUMENTS

| | | | |
|---|---|---|---|
| 2018/0268696 A1* | 9/2018 | Morotomi | B62D 15/021 |
| 2018/0322787 A1* | 11/2018 | Shimizu | G08G 1/165 |
| 2019/0202450 A1 | 7/2019 | Maeda et al. | |
| 2019/0291730 A1* | 9/2019 | Kamiya | G06V 20/58 |
| 2020/0079371 A1 | 3/2020 | Sakamoto et al. | |

* cited by examiner

FIG. 8

| REQUIRED STEERING DISTANCE [m] | | SPEED [km/h] | | | | |
| --- | --- | --- | --- | --- | --- | --- |
| | | 0 | 10 | ... | 50 | ... |
| REQUIRED LATERAL MOVEMENT AMOUNT [m] | 0 | 0 | 0 | ... | 0 | ... |
| | 0.1 | 0 | 8 | ... | 13 | ... |
| | ... | ... | ... | ... | ... | ... |
| | 0.5 | 0 | 14 | ... | 22 | ... |
| | : | ... | ... | ... | ... | ... |

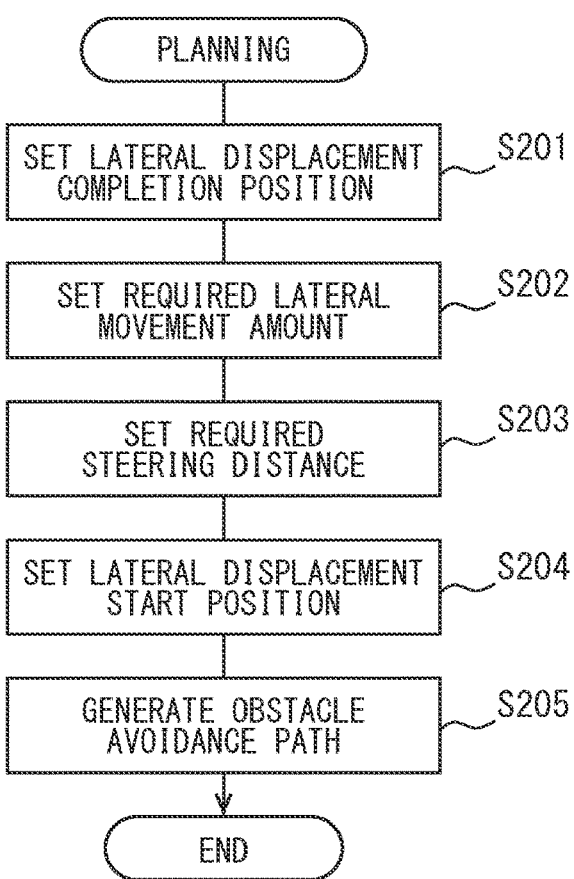

```
        ┌─────────────┐
        │  PLANNING   │
        └─────────────┘
               │
  ┌─────────────────────────────┐
  │ SET LATERAL DISPLACEMENT     │─── S201
  │     COMPLETION POSITION      │
  └─────────────────────────────┘
               │
  ┌─────────────────────────────┐
  │  SET REQUIRED LATERAL        │─── S202
  │     MOVEMENT AMOUNT          │
  └─────────────────────────────┘
               │
  ┌─────────────────────────────┐
  │      SET REQUIRED            │─── S203
  │    STEERING DISTANCE         │
  └─────────────────────────────┘
               │
  ┌─────────────────────────────┐
  │ SET LATERAL DISPLACEMENT     │─── S204
  │      START POSITION          │
  └─────────────────────────────┘
               │
  ┌─────────────────────────────┐
  │   GENERATE OBSTACLE          │─── S205
  │    AVOIDANCE PATH            │
  └─────────────────────────────┘
               │
        ┌─────────────┐
        │     END     │
        └─────────────┘
```

FIG. 19

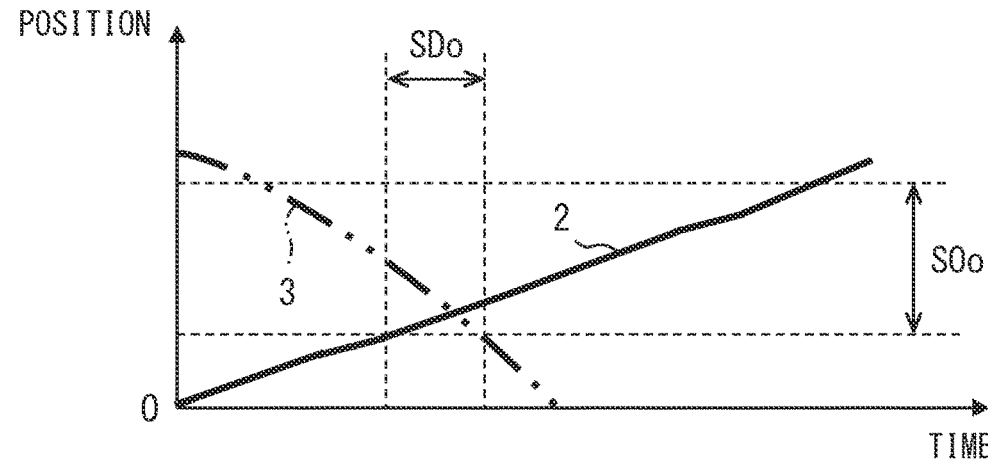

PROCESSING METHOD, PROCESSING SYSTEM AND STORAGE MEDIUM FOR STORING PROCESSING PROGRAM FOR PLANNING DRIVING CONTROL FROM A HOST LANE TO AN ONCOMING LANE

CROSS REFERENCE TO RELATED APPLICATION

This application is a continuation application of International Patent Application No. PCT/JP2022/018844 filed on Apr. 26, 2022, which designated the U.S. and claims the benefit of priority from Japanese Patent Application No. 2021-086370 filed on May 21, 2021. The entire disclosure of all the above application is incorporated herein by reference.

TECHNICAL FIELD

The present disclosure relates to processing technology for performing processing related to driving a mobile object.

BACKGROUND

There has been known processing technology where a drive control related to a navigation operation of a host vehicle is planned according to detection information related to internal and external environments of the host vehicle. During such planning, when it is determined that there is potential accident liability based on a safety model following a driving policy and the detection information, a constraint is provided to the drive control.

SUMMARY

According to one aspect of the present disclosure, a processing method performed by a processor for executing a process related to driving of a host mobile object in an obstacle avoidance scene where the host mobile object avoids an obstacle zone that interferes with travelling of the host mobile object by deviating from a host lane to an oncoming lane. The processing method includes steps of: monitoring a target mobile object traveling in the oncoming lane; and upon determining that the target mobile object traveling in the oncoming lane is detected, selecting, as driving control given to the host mobile object according to an overlapping travel situation where a future travel of the host mobile object and a future travel of the target mobile object would overlap with each other in the oncoming lane, either (i) deviation control for the host mobile object to deviate from the host lane to the oncoming lane, or (ii) standby control for the host mobile object to stay in the host lane.

BRIEF DESCRIPTION OF THE DRAWINGS

Objects, features, and advantages of the present disclosure will become more apparent from the following detailed description made with reference to the accompanying drawings, in which:

FIG. 8 is a property table for explaining planning of obstacle avoidance paths according to one embodiment;

FIG. 14 is still yet another schematic diagram showing the obstacle avoidance scene to which one embodiment is applied;

FIG. 18 is a flowchart showing a planning subroutine according to one embodiment; and FIG. 19 is a graph for explaining the drive control according to a modification.

DETAILED DESCRIPTION

Figure 1:
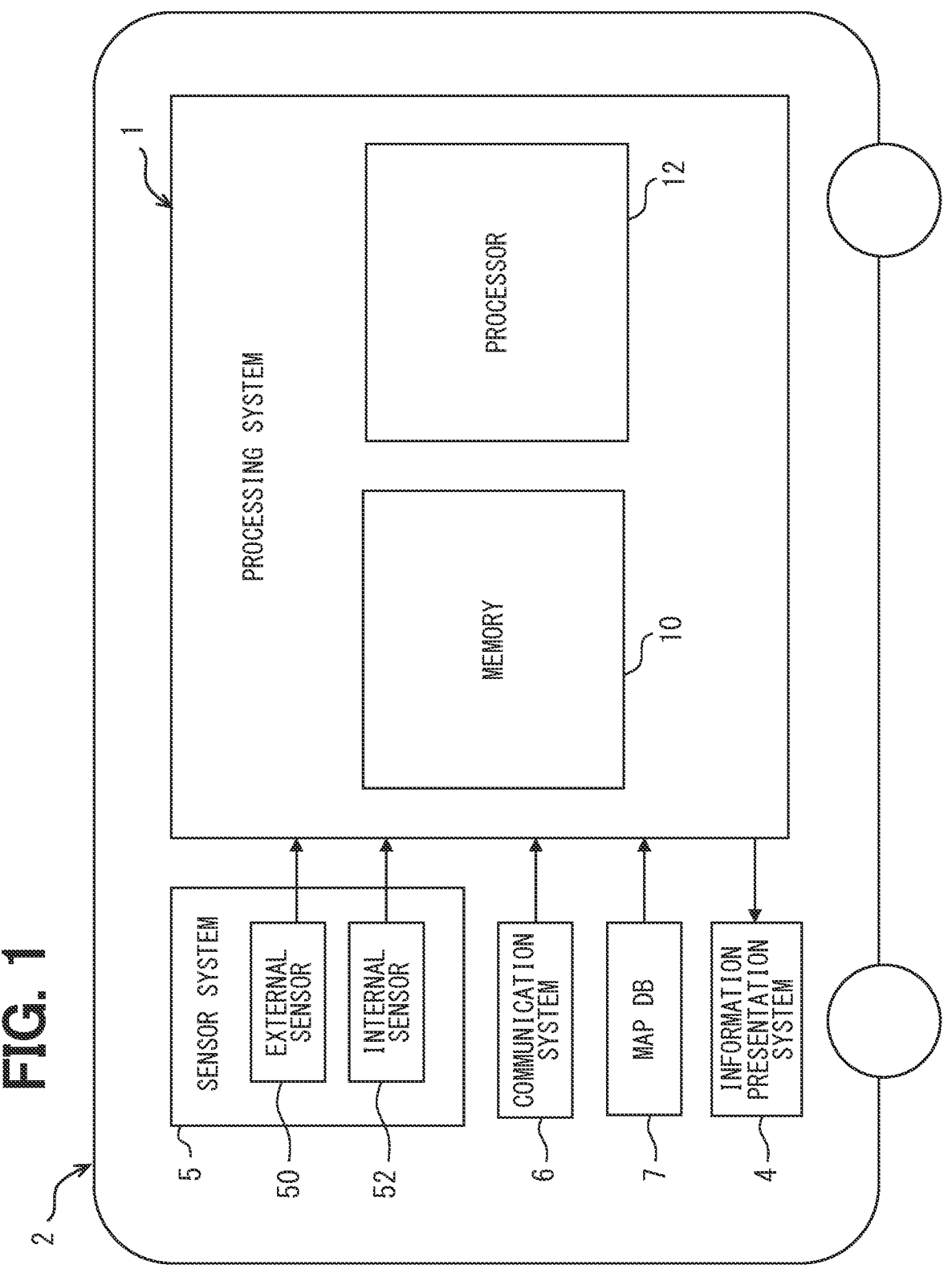
FIG. 1 is a block diagram showing an overall configuration of a processing system according to an embodiment.

To begin with, a relevant technology will be described first only for understanding the following embodiments. When coping with an obstacle avoidance scene in which deviation to an oncoming lane is made by the host vehicle for avoiding an obstacle zone where travel of the host vehicle is hindered in a host lane by an obstacle, a priority determination by the host vehicle and a priority determination by a target vehicle that is traveling in the oncoming lane may possibly be inconsistent.

It is one objective of the present disclosure to provide a processing method that facilitates appropriate coping with an obstacle avoidance scene. Another object of the present disclosure is to provide a processing system that that facilitates appropriate coping with an obstacle avoidance scene. Yet another object of the present disclosure is to provide a processing program that facilitates appropriate coping with an obstacle avoidance scene.

According to one aspect of the present disclosure, a processing method performed by a processor for executing a process related to driving of a host mobile object in an obstacle avoidance scene where the host mobile object avoids an obstacle zone that interferes with travelling of the host mobile object by deviating from a host lane to an oncoming lane. The processing method includes steps of: monitoring a target mobile object traveling in the oncoming lane; and upon determining that the target mobile object traveling in the oncoming lane is detected, selecting, as driving control given to the host mobile object according to an overlapping travel situation where a future travel of the host mobile object and a future travel of the target mobile object would overlap with each other in the oncoming lane, either (i) deviation control for the host mobile object to deviate from the host lane to the oncoming lane, or (ii) standby control for the host mobile object to stay in the host lane.

According to a second aspect of the present disclosure, a processing system has a processor and executes a process related to driving of a host mobile object in an obstacle avoidance scene where the host mobile object avoids an obstacle zone that interferes with travelling of the host mobile object by deviating from a host lane to an oncoming lane. The processor is configured to: monitor a target mobile object traveling in the oncoming lane; and upon determining that the target mobile object traveling in the oncoming lane is detected, select, as driving control given to the host mobile object according to an overlapping travel situation where a future travel of the host mobile object and a future travel of the target mobile object would overlap with each other in the oncoming lane, either (i) deviation control for the host mobile object to deviate from the host lane to the oncoming lane, or (ii) standby control for the host mobile object to stay in the host lane.

According to a third aspect of the present disclosure, a non-transitory, computer readable, tangible storage medium stores instructions executable by a processor as a computer-readable processing program for executing a process related to driving of a host mobile object in an obstacle avoidance scene where the host mobile object avoids an obstacle zone that interferes with travelling of the host mobile object by deviating from a host lane to an oncoming lane. The instructions, when executed by the processor, cause the processor to perform: monitoring a target mobile object traveling in the oncoming lane; and upon determining that the target mobile object traveling in the oncoming lane is detected, selecting, as driving control given to the host mobile object according to an overlapping travel situation where a future travel of the host mobile object and a future travel of the target mobile object would overlap with each other in the oncoming lane, either (i) deviation control for the host mobile object to deviate from the host lane to the oncoming lane, or (ii) standby control for the host mobile object to stay in the host lane.

According to these first to third aspects, in an obstacle avoidance scene in which the host mobile object avoids an obstacle zone in which travel of the host mobile object is hindered in the host lane which run in parallel with the oncoming lane, processing related to drive of the host mobile object is performed. In such drive-related processing, when it is determined that the target mobile object traveling in the oncoming lane has been detected, drive control provided for the host mobile object is selected, according to an overlapping travel situation in which a future travel of the host mobile object and a future travel of the target mobile object overlap (with each other) in the oncoming lane. According to the above, it is possible to appropriately prioritize (a) deviation control deviating to the oncoming lane for avoiding the obstacle zone and (b) standby control staying in the host lane for delaying avoidance of the obstacle zone according to the overlapping travel situation. Therefore, an appropriate coping with an obstacle avoidance scene would be suitably facilitatable.

Hereinafter, an embodiment of the present disclosure will be described with reference to the drawings.

The processing system 1 of one embodiment shown in FIG. 1 performs processing related to a drive of a host mobile object (hereinafter referred to as drive-related processing). A host vehicle 2 and a target vehicle 3 shown in FIG. 2 are a host mobile object and a target mobile object, respectively, for which the processing system 1 performs drive-related processing. From a viewpoint centering on the host vehicle 2, the host vehicle 2 can also be called as an ego-vehicle. From a viewpoint centering on the host vehicle 2, the target vehicle 3 can also be called as an other road user.

Figure 2:
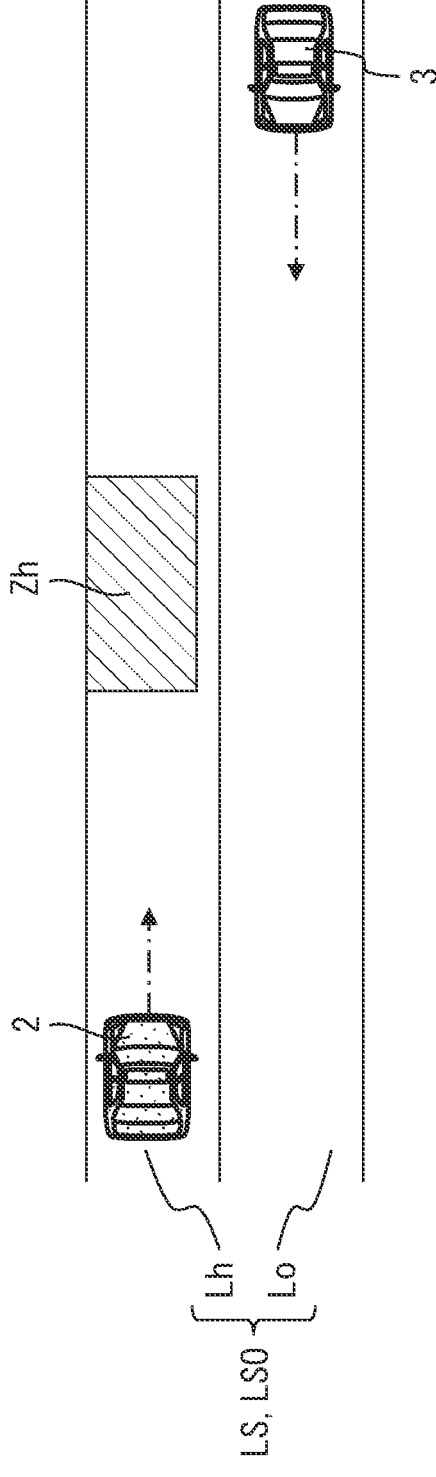
FIG. 2 is a schematic diagram showing a travel environment of a host vehicle to which one embodiment is applied.

In the host vehicle 2 shown in FIGS. 1 and 2, automatic driving is performed. The automatic driving is classified into levels according to a degree of manual intervention by an occupant in a dynamic driving task (hereinafter, referred to as DDT). The automatic driving may be realized through autonomous traveling control, such as conditional driving automation, advanced driving automation, or full driving automation, in which the operating system executes all DDTs. The automatic driving may be realized in an advanced driver-assistance control, such as driving assistance or partial driving automation, in which a driver as the occupant executes some or all of the DDT. The automatic driving may be realized by either one, combination, or switching between autonomous traveling control and advanced driver-assistance control.

As shown in FIG. 1, the host vehicle 2 is equipped with a sensor system 5, a communication system 6, a map DB (Data Base) 7, and an information presentation system 4. The sensor system 5 obtains sensor data which is usable by the processing system 1 by detecting an outside and an inside of the host vehicle 2. For such purposes, the sensor system 5 is configured to include an external sensor 50 and an internal sensor 52.

The external sensor 50 detects targets existing in the outside of the host vehicle 2. The target detection type external sensor 50 is at least one type of, for example, camera, light detection and ranging/laser imaging detection and ranging (LiDAR), laser radar, millimeter wave radar, ultrasonic sonar, and the like. The internal sensor 52 detects a specific physical quantity related to vehicle movement (hereinafter referred to as physical quantity of motion) in the inside of the host vehicle 2 and a state of the occupant. The internal sensor 52 is, for example, at least one type of a speed sensor, an acceleration sensor, a gyro sensor, an actuator sensor, a driver status monitor (registered trademark), a biosensor, a seating sensor, an in-vehicle equipment sensor, and the like.

The communication system 6 obtains communication data which is usable by the processing system 1 by wireless communication. The communication system 6 may receive a positioning signal from an artificial satellite of a global navigation satellite system (GNSS) existing in the outside of the host vehicle 2. The positioning type communication system 6 is, for example, a GNSS receiver or the like. The communication system 6 may transmit and receive communication signals with a V2X system existing in the outside of the host vehicle 2. The V2X type communication system 6 is at least one type of, for example, a dedicated short range communications (DSRC) communication device, a cellular V2X (C-V2X) communication device, and the like. The communication system 6 may transmit and receive communication signals to and from a terminal existing in the inside of the host vehicle 2. The terminal communication type communication system 6 is at least one type of, for example, Bluetooth (registered trademark) device, Wi-Fi (registered trademark) device, infrared communication device, and the like.

The map DB 7 stores map data, which are usable by the processing system 1. The map DB 7 includes at least one type of non-transitory, tangible storage medium such as a semiconductor memory, a magnetic medium, and an optical medium. The map DB 7 may be a DB of a locator for estimating a self-state quantity of the host vehicle 2 including its self position. The map DB may be a DB of a navigation unit that navigates a travel route of the host vehicle 2. The map DB 7 may be constructed as a combination of multiple types of DBs.

For example, the map DB 7 obtains and stores the latest map data through communication with an external center via the V2X type communication system 6. The map data is two-dimensional or three-dimensional data as a data representing a travel environment of the host vehicle 2. Digital data of a high definition map may be adopted as the three-dimensional map data. The map data may include road data representing at least one type of, for example, positional coordinates, a shape, a road surface condition, and the like of a road structure. The map data may include, for example, marking data representing at least one type of positional coordinates, a shape, and the like of a traffic sign, a road display, and a lane marking attached to a road. The map data may include structure data representing at least one type of positional coordinates, a shape, and the like of a building and a traffic light facing the road, for example.

The information presentation system 4 presents notification information to occupants including the driver of the host vehicle 2. The information presentation system 4 includes a visual presentation unit, an auditory presentation unit, and a skin sensation presentation unit. The visual presentation unit presents notification information by stimulating a visual sense of the occupant. The visual presentation unit is at least one type of, for example, a head-up display (HUD), a multi function display (MFD), a combination meter, a navigation unit, a light emitting unit, and the like. The auditory presentation unit presents notification information by stimulating an auditory sense of the occupant. The auditory presentation unit is at least one type of, for example, a speaker, a buzzer, a vibration unit, and the like. The skin sensation presentation unit presents notification information by stimulating a skin sensations of the occupant. The skin sensation presentation unit is, for example, at least one of a steering wheel vibration unit, a driver's seat vibration unit, a steering wheel reaction force unit, an accelerator pedal reaction force unit, a brake pedal reaction force unit, an air conditioning unit and the like.

In the processing system 1 as shown in FIG. 2, a lane structure LS with separated lanes is assumed. The lane structure LS regulates the movement of the host vehicle 2 and the target vehicle 3 with the direction in which the lane extends as the longitudinal direction. The lane structure LS regulates the movement of the host vehicle 2 and the target vehicle 3 with the lateral direction of the lanes being the width direction or the direction in which the lanes run side by side. Here, the lane structure LS assumed in FIG. 2 is an oncoming structure LSO, in which a host lane Lh in which the host vehicle 2 travels and an oncoming lane Lo in which the target vehicle 3 travels in the opposite direction oncoming to the host vehicle 2 are parallel to each other. In particular, in the oncoming structure LSO assumed in the present embodiment, an obstacle zone Zh (see diagonal hatching upward to the right in FIG. 2) which is an obstacle of the host vehicle 2 in a future travel in the host lane Lh is avoidable by a temporary deviation to the oncoming lane Lo.

In the processing system 1, a safety model is used which is described according to driving policy and its safety. Here, driving policy is defined based on a vehicle-level safety strategy that guarantees safety of the intended functionality (Safety Of The Intended Functionality: hereinafter referred to as SOTIF).

In the processing system 1, driving policy between the host vehicle 2 and the target vehicle 3 in the lane structure LS is defined, for example, as following items (A) to (E). Note that a forward direction with respect to the host vehicle 2 is, for example, either (a) a travel direction of the host vehicle 2 on a turning circle at a current steering angle, (b) a travel direction of the host vehicle 2 defined as a straight line passing through a center of gravity of the host vehicle 2 perpendicular to the axle of the host vehicle 2, (c) a travel direction of the host vehicle 2 defined as an axis line of an FOE (Focus of Expansion) from a front camera module in the sensor system 5, or the like.

(A) Do not hit a vehicle traveling in front from behind (Do not hit someone from behind).

(B) Do not cut in recklessly between other vehicles (Do not cut-in recklessly).

(C) Yield to another vehicle even when own vehicle has a priority (Right-of-way is given, not taken).

(D) Be cautious in areas with limited visibility.

(E) If the host vehicle can avoid a crash without causing another one, take a reasonable action for that purpose (If you can avoid an accident without causing another one, you must do it).

In the processing system 1, a safety model is described by following driving policy that implements a vehicle-level safety strategy and by modeling the SOTIF. The safety model may be at least one of a safety-related model itself and a model forming part of the safety-related model. The safety model assumes a behavior of a road user that does not lead to unreasonable situations, i.e., proper and reasonable behavior that should be taken as a proper response. Here, the unreasonable situations between the host vehicle 2 and the target vehicle 3 in the lane structure LS are head-on collisions, rear-end collisions, and side collisions. A reasonable behavior in a head-on collision includes, for example, applying a brake for a vehicle traveling in the wrong direction and the like. A reasonable behavior in a rear-end collision includes avoidance of abrupt braking by a vehicle traveling ahead, and avoidance of a rear-end collision by a vehicle traveling behind based on an assumption of avoidance of abrupt braking and the like. A reasonable behavior in a side collision includes that vehicles travel side by side steer away from each other and the like.

The safety model may be used in the processing system 1 to plan a future travel path, including a route and trajectory of the host vehicle 2. Further, the safety model may be trained by a machine learning algorithm that propagates, back to the safety model, results of drive control according to such plan. As the safety model to be trained, it is preferable to use at least one type of learning model among deep learning by a neural network such as DNN (Deep Neural Network), reinforcement learning, and the like.

In the processing system 1, a safety model may be designed according to an accident liability rule, in which a mobile object that has not taken a reasonable behavior is responsible for an accident. The safety model used to monitor the risk between the host vehicle 2 and the target vehicle 3 under the accident liability rule according to the driving policy on the lane structure LS may preferably be designed to avoid liability of a potential accident due to unreasonable risk or misuse of a road user by a reasonable behavior. Such a safety model includes, for example, a Responsibility Sensitive Safety (RSS) model as disclosed in Patent Document 1, and the like.

In the processing system 1, a safety envelope is set according to driving policy, which guarantees the SOTIF in the host vehicle 2 based on, for example, a vehicle-level safety strategy and the like. In setting a safety envelope, a safety distance is assumed from a profile relating to at least one type of kinematic quantity based on a safety model between the host vehicle 2 and the target vehicle 3 assuming that such a model follows driving policy.

Here, the safety distance in the lane structure LS defines a boundary guaranteeing a physics-based margin around the host vehicle 2 against the expected movement of objects such as the target vehicle 3 and the like. Therefore, in setting the safety envelope in the lane structure LS, a safety distance for avoiding the risk of rear-end collision and head-on collision in the longitudinal direction of the host vehicle 2 and a safety distance for avoiding the risk of side collision in the lateral direction of the host vehicle 2 are preferably assumed. Further, a safety distance in the lane structure LS defines a boundary guaranteeing a physics-based margin around the expected target vehicle 3 or other object against the movement of the host vehicle 2. Therefore, in the setting of the safety envelope in the lane structure LS, a safety distance to avoid the risk of rear-end collision and frontal collision in the longitudinal direction of the object such as the target vehicle 3 and a safety distance to avoid the risk of side collision in the lateral direction of the object may be preferably assumed.

In the processing system 1, by comparing an actual distance between the host vehicle 2 and the target vehicle 3 with the safety distance based on the safety model for each of driving scenes, it is determined whether or not there is a violation of the safety envelope. If a result of such a determination indicates that there is a violation of the safety envelope, it may be preferable to set a constraint on drive control of the vehicle 2, as a reasonable action for each of state transitions between the vehicles 2 and 3 based on reasonably foreseeable assumptions.

As shown in FIG. 1, the processing system 1 is connected to the sensor system 5, the communication system 6, the map DB 7 and the information presentation system 4 via at least one of a LAN (Local Area Network), a wire harness, an internal bus, a wireless communication line, and the like. The processing system 1 includes at least one dedicated computer. The dedicated computer that constitutes the processing system 1 may be an integrated ECU (Electronic Control Unit) that integrates drive controls of the host vehicle 2. The dedicated computer that constitutes the processing system 1 may be a determination ECU that is configured to determine the DDT for the drive control of the host vehicle 2. The dedicated computer that constitutes the processing system 1 may be a monitoring ECU that monitors the drive control of the host vehicle 2. The dedicated computer that constitutes the processing system 1 may be an evaluation ECU that evaluates the drive control of the host vehicle 2.

The dedicated computer that constitutes the processing system 1 may be a navigation ECU that navigates the travel route of the host vehicle 2. The dedicated computer that constitutes the processing system 1 may be a locator ECU that estimates a self-state quantity of the host vehicle 2, including the self position of the host vehicle 2. The dedicated computer that constitutes the processing system 1 may be an actuator ECU that controls motion actuators of the host vehicle 2. The dedicated computer that constitutes the processing system 1 may be an HCU (Human Machine Interface Control Unit, or HMI Control Unit) that controls information presentation in the host vehicle 2. The dedicated computer that constitutes the processing system 1 may be at least one external computer that constructs an external center or a mobile terminal device that is configured to perform communication via the communication system 6, for example.

The dedicated computer of the processing system 1 has at least one memory 10 and at least one processor 12. The memory 10 is at least one type of non-transitory, tangible storage medium, such as a semiconductor memory, a magnetic medium, or an optical medium, for storing, in a non-transitory manner, computer readable programs, data and the like. The processor 12 includes, as a core, at least one type of, for example, a CPU (Central Processing Unit), a GPU (Graphics Processing Unit), an RISC (Reduced Instruction Set Computer) CPU, and the like.

Figure 3:
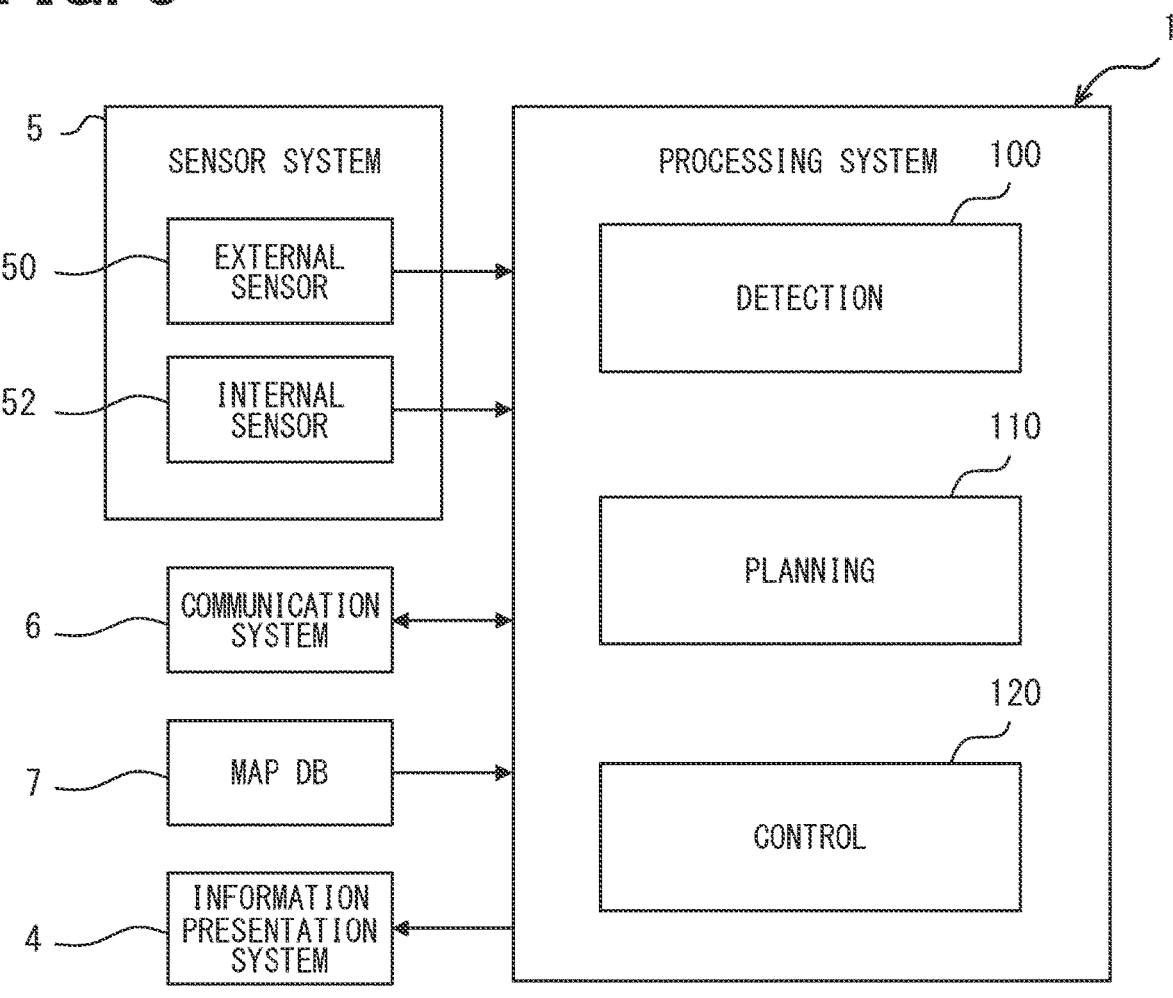
FIG. 3 is a block diagram of a functional configuration of the processing system according to the embodiment.

The processor 12 executes multiple instructions included in a processing program stored in the memory 10 as software. Accordingly, the processing system 1 constructs multiple functional blocks to perform drive control processing of the host vehicle 2. In such manner, in the processing system 1, a plurality of functional blocks are constructed by causing the processor 12 to execute a plurality of instructions from the processing program stored in the memory 10 in order to perform the drive control processing of the host vehicle 2. A plurality of functional blocks constructed by the processing system 1 include a detection block 100, a planning block 110 and a control block 120 as shown in FIG. 3.

Figure 4:
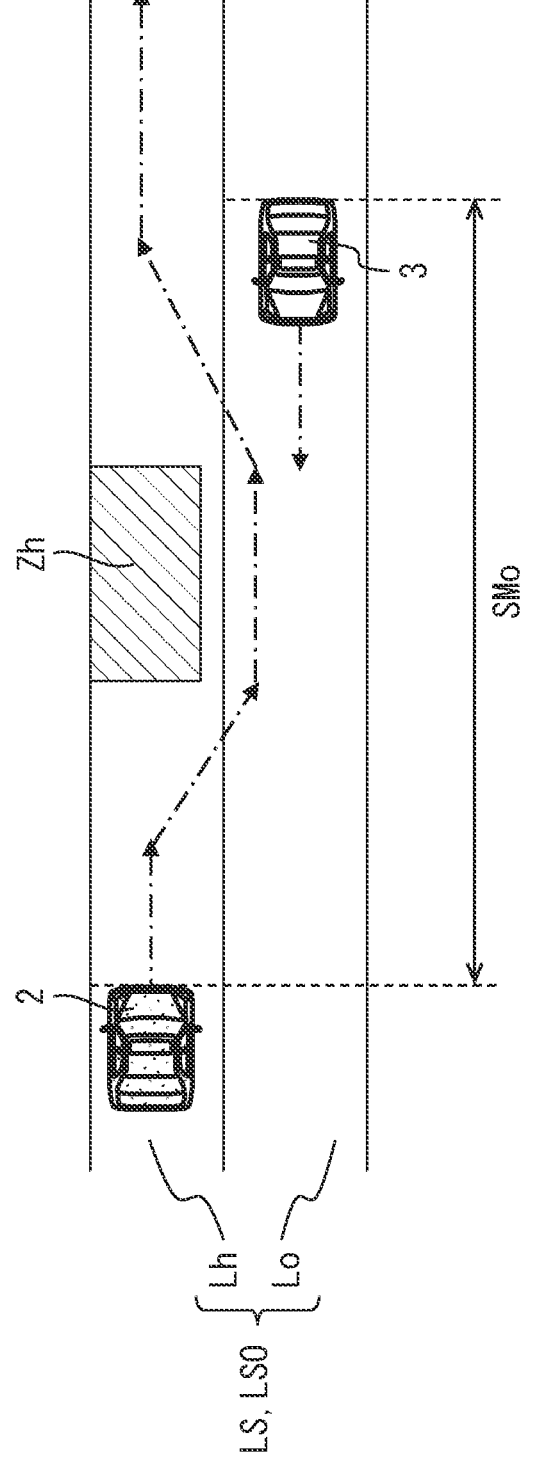
FIG. 4 is a schematic diagram showing an obstacle avoidance scene to which one embodiment is applied.

The detection block 100 monitors whether or not there is an obstacle zone Zh that will hinder future travel of the host vehicle 2 in the host lane Lh of the oncoming structure LSO. Such monitoring may also be considered as a process of determining a transition to an obstacle avoidance scene in which the host vehicle 2 returns to the host lane Lh after avoiding the obstacle zone Zh by temporarily deviating from the host lane Lh to the oncoming lane Lo as shown in FIG. 4. Monitoring of the obstacle zone Zh by the detection block 100 is performed based on data obtained by at least one of the sensor system 5, the communication system 6, and the map DB 7.

Figure 5:
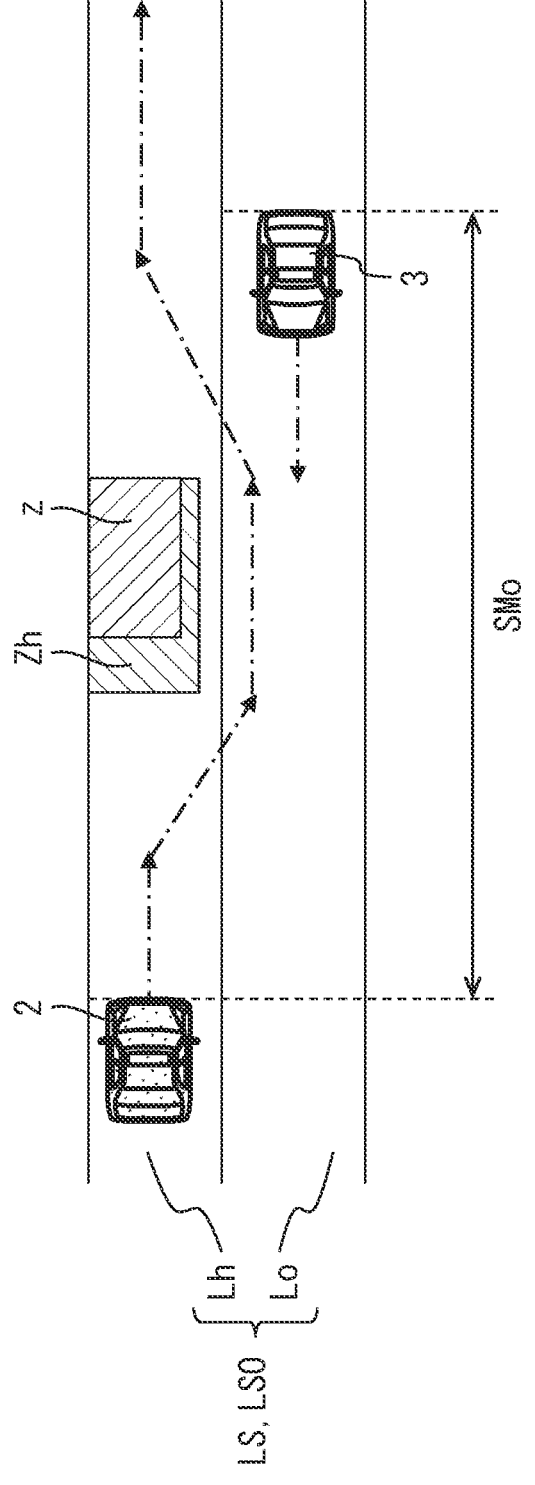
FIG. 5 is another schematic diagram showing the obstacle avoidance scene to which one embodiment is applied.

In the monitoring of the obstacle zone Zh by the detection block 100, the obstacle zone Zh is defined as a zone in which the host vehicle 2 is not travelable in the host lane Lh alone due to, for example, an obstacle, construction work, cleaning, accident processing, or the like. Here, as shown in FIG. 5, for example, when an object z such as an obstacle (see diagonal hatching downward to the right in FIG. 5) exists in the host lane Lh, a rectangular obstacle zone Zh is recognized as a range of the safety envelope ensuring the safety distance assumed in both of the vertical and horizontal directions of the object and the host vehicle 2. At this time, the safety envelope is set based on a safety model that follows the driving policy between the object and the host vehicle 2, with a constraint of the maximum allowable acceleration in the longitudinal direction assumed to be imposed on an object side.

The detection block 100 monitors the presence or absence of the target vehicle 3 traveling in the oncoming lane Lo of the oncoming structure LSO when determining a transition to the obstacle avoidance scene. Such monitoring may also be considered as a process of detecting the target vehicle 3 for which a safety model needs to be assumed between the target vehicle 3 and the host vehicle 2 in the obstacle avoidance scene.

The monitoring of travel of the target vehicle 3 by the detection block 100 is performed based on data obtained by at least one of the sensor system 5, the communication system 6, and the map DB 7. At this time, the detection block 100 sets, as shown in FIGS. 4 and 5, a monitoring section SMo for monitoring the travel of the target vehicle 3 in the oncoming lane Lo. As the monitoring section SMo, a section in the oncoming lane Lo is assumed as relevant, which is in parallel with a combination of the obstacle zone Zh and sections on both sides thereof in the host lane Lh. Here, the sections on both sides of the obstacle zone Zh that determine the monitoring section SMo are sections with the same or different set distances on both sides sandwiching the obstacle zone Zh from the front and rear as viewed from the host vehicle 2.

Figure 6:
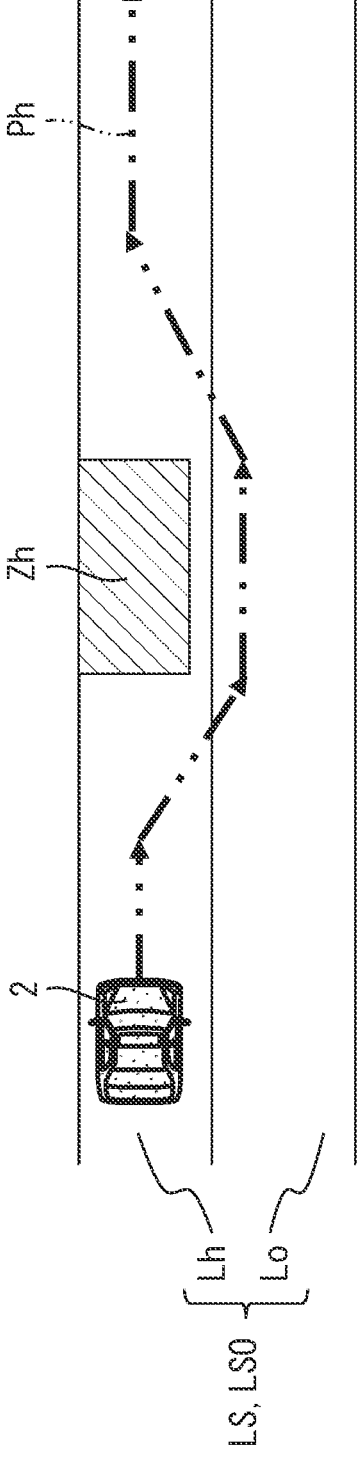
FIG. 6 is yet another schematic diagram showing the obstacle avoidance scene to which one embodiment is applied.

The planning block 110 shown in FIG. 3 plans an obstacle avoidance path Ph, as shown by a two-dot chain line in FIG. 6, to provide the host vehicle 2 with deviation control to avoid the obstacle zone Zh by a temporary deviation from the host lane Lh to the oncoming lane Lo. The planning of the obstacle avoidance path Ph by the planning block 110 is performed based on data obtained by at least one of the sensor system 5, the communication system 6, and the map DB 7. In the planning of the obstacle avoidance path Ph by the control block 120, a plurality of planning parameters required for the planning are set by using the safety model.

Figure 7:
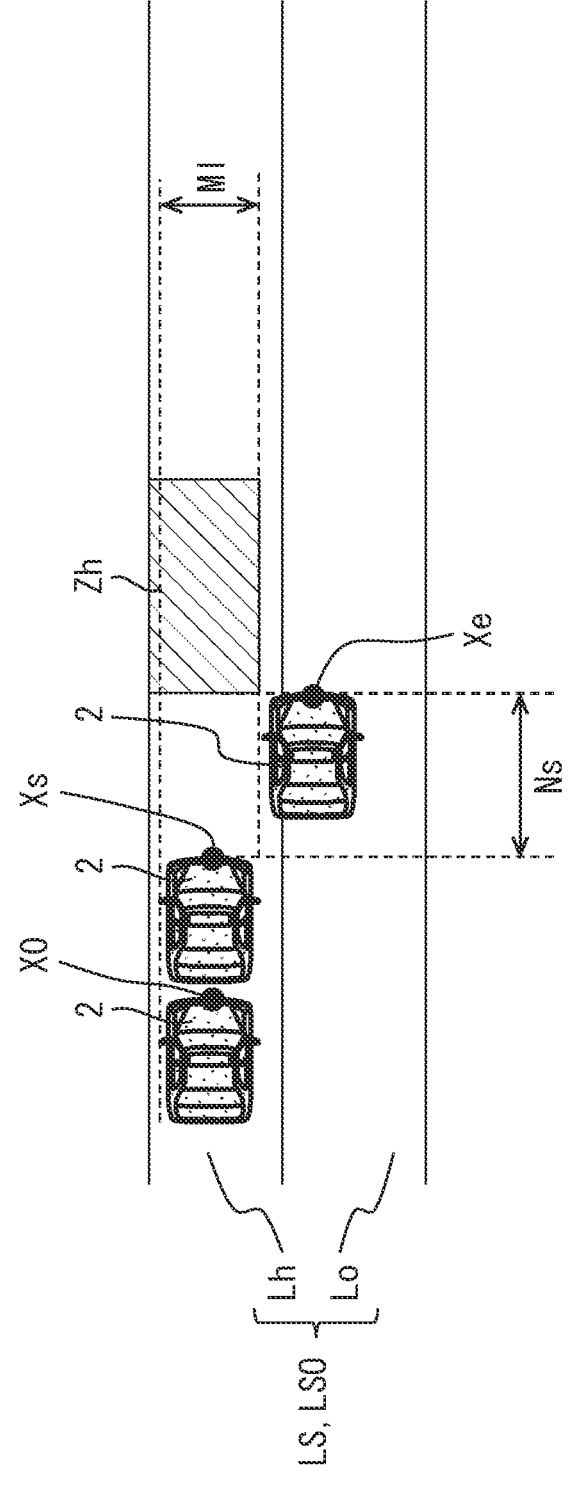
FIG. 7 is still yet another schematic diagram showing the obstacle avoidance scene to which one embodiment is applied.

Specifically, the planning block 110 sets a position at which the lateral displacement to the oncoming lane Lo required for avoiding the obstacle zone Zh is complete as a lateral displacement completion position Xe shown in FIG. 7. At this time, the lateral displacement completion position Xe is set as a front center position of the the host vehicle 2 when a front side (i.e., left) corner of the host vehicle 2 on one side opposite to the oncoming lane Lo comes to be squared with a rear side (i.e., right) corner of the obstacle zone Zh, which is a corner made by a rear side and a right side thereof.

The planning block 110 sets an amount of lateral displacement (a) from an initial position XO of the host vehicle 2 at a transition determination timing to the obstacle avoidance scene by the detection block 100 (hereinafter referred to as a transition determination timing) (b) to the lateral displacement completion position Xe as a required lateral movement amount MI shown in FIG. 7. At this time, the required lateral movement amount MI is set to a maximum separation distance between a contour of the host vehicle 2 on one side opposite to the oncoming lane Lo and a contour of the obstacle zone Zh on an oncoming lane Lo side.

The planning block 110 sets a longitudinal distance required for steering the host vehicle 2 to the lateral displacement completion position Xe as a required steering distance Ns shown in FIG. 7. At this time, the required steering distance Ns is set according to the speed and the required lateral movement amount MI of the host vehicle at the transition determination timing, so that the lateral acceleration (i.e., lateral G) assumed in the lateral direction of the host vehicle 2 by the safety model does not exceed a set threshold value. Such a required steering distance Ns may be set using table data for the speed and the required lateral movement amount MI shown in FIG. 8, a correlation function for correlating the speed and the required lateral movement amount MI, or the like.

The planning block 110 sets a position where the lateral displacement to the oncoming lane Lo in the host lane Lh is started as a lateral displacement start position Xs shown in FIG. 7. At this time, the lateral displacement start position Xs is set at a position spaced by the required steering distance Ns in the longitudinal direction from a contour of the obstacle zone Zh on one side facing the host vehicle 2 toward the front center position of the host vehicle 2 at the transition determination timing.

Figure 9:
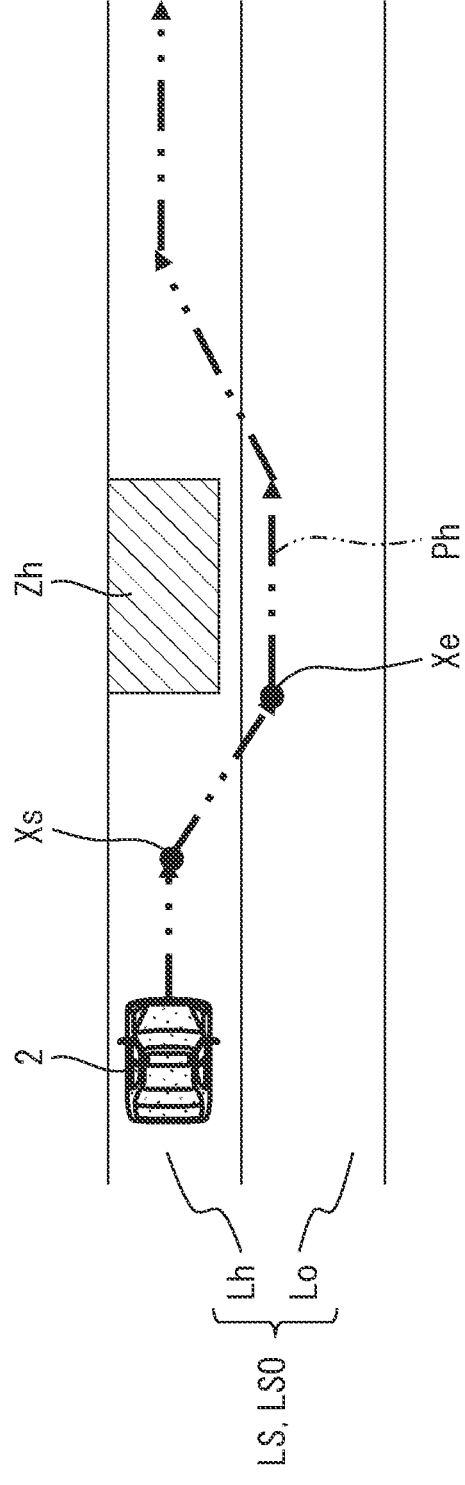
FIG. 9 is still yet another schematic diagram showing the obstacle avoidance scene to which one embodiment is applied.

As described above, based on a plurality of parameters for planning, including the required steering distance Ns that limits the lateral acceleration to a set threshold value or less, the planning block 110 generates an obstacle avoidance path Ph from the lateral displacement start position Xs via the lateral displacement completion position Xe as shown in FIG. 9.

The control block 120 shown in FIG. 3 selects drive control to be given to the host vehicle 2 when it is determined that the target vehicle 3 traveling in the oncoming lane Lo has been detected by the detection block 100 in a transition avoidance scene. As a drive control given to the host vehicle 2 by the control block 120, one of deviation control to the oncoming lane Lo and standby control in the host lane Lh is selected in each control cycle.

Figure 10:
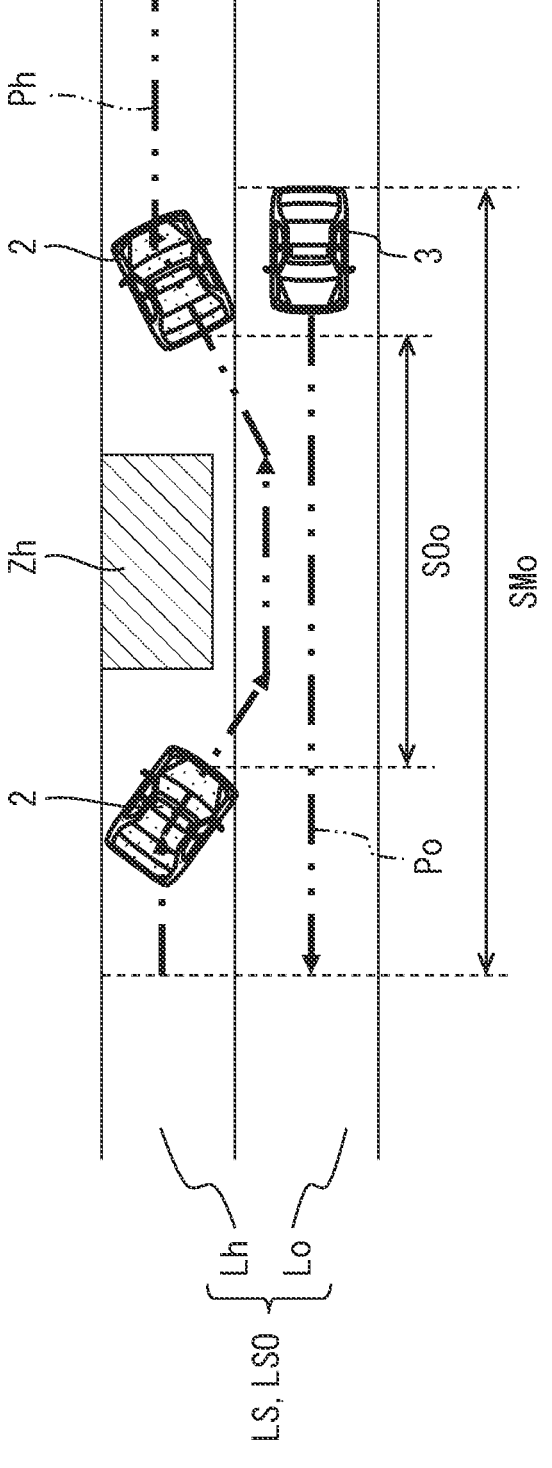
FIG. 10 is still yet another schematic diagram showing the obstacle avoidance scene to which one embodiment is applied.

Specifically, the control block 120 sets, in the oncoming lane Lo, a deviation section SOo, which is planned by the planning block 110, deviating at least part of the host vehicle 2 from the host lane Lh as shown in FIG. 10. The setting of the deviation section SOo by the control block 120 is performed based on data obtained by at least one of the sensor system 5, the communication system 6, and the map DB 7.

Figure 11:
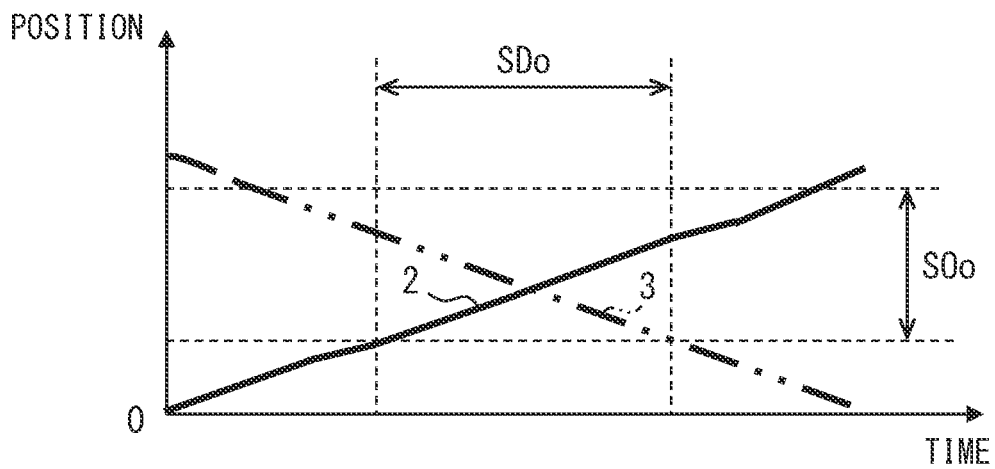
FIG. 11 is a graph for explaining a drive control according to one embodiment.

The control block 120 estimates an overlapping travel situation in which the future travels of the host vehicle 2 and the target vehicle 3 overlap with each other in the deviation section SOo set in the oncoming lane Lo, as shown in FIGS. 10 and 11. Prediction of overlapping travel situations by the control block 120 is performed based on data obtained by at least one of the sensor system 5, the communication system 6, and the map DB 7. At this time, the control block 120 individually predicts a future travel state of the vehicles 2 and 3 in the deviation section SOo, which is an estimation target of the overlapping travel situation.

As the future travel state of the host vehicle 2, the control block 120 predicts a drive control state that follows the obstacle avoidance path Ph in the deviation section SOo as shown in FIG. 10. The prediction of the drive control state of the host vehicle 2 by the control block 120 is performed based on at least one of the travel position, the speed, and the acceleration of the host vehicle 2 at a detection determination timing of the target vehicle 3 by the detection block 100 (hereinafter, simply referred to as a detection determination timing). At this time, as shown in FIG. 11, in the present embodiment, by controlling the acceleration of the host vehicle 2 to a zero value, a drive control state in which the speed of the host vehicle 2 is kept substantially constant from the detection determination timing is predicted.

As the future travel state of the target vehicle 3, the control block 120 predicts an oncoming travel path Po predicted for the target vehicle 3 in the deviation section SOo shown in FIG. 10. The prediction of the oncoming travel path Po with respect to the target vehicle 3 by the control block 120 is performed based on data obtained by at least one of the sensor system 5, the communication system 6, and the map DB 7.

The prediction of the drive control state of the target vehicle 3 by the control block 120 is performed based on at least one of the travel position, the speed, and the acceleration of the target vehicle 3 at a detection timing. At this time, as shown in FIG. 11, in the present embodiment, a drive control state that controls the acceleration of the target vehicle 3 to the maximum allowable acceleration in the longitudinal direction assumed by the safety model is predicted until, for example, the speed of the target vehicle 3 reaches the allowable upper limit speed assumed as the legal speed limit. Further, as shown in FIG. 11, in the present embodiment, after the speed of the target vehicle 3 reaches the allowable upper limit speed, a drive control state in which the speed of the target vehicle 3 is kept substantially constant by controlling the acceleration of the target vehicle 3 to a zero value is predicted.

The control block 120 estimates, as an overlapping travel situation, whether or not there is an overlapping section SDo where the future travels of the vehicles 2 and 3 whose drive control states are predicted overlap as shown in FIG. 11. Therefore, when the overlapping section SDo is estimated to occur, the control block 120 selects a movement control provided for the host vehicle 2, in accordance with a movement state of the target vehicle 3 in the monitoring section SMo of the oncoming lane Lo in each control cycle.

Figure 12:
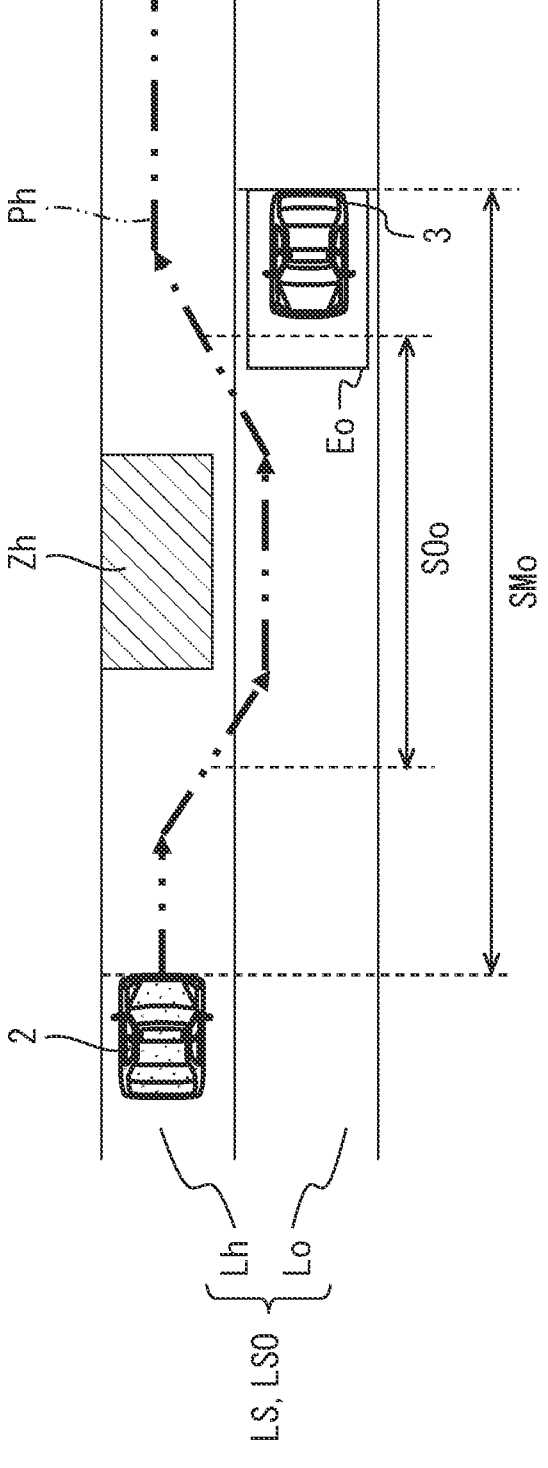
FIG. 12 is still yet another schematic diagram showing the obstacle avoidance scene to which one embodiment is applied.
Figure 13:
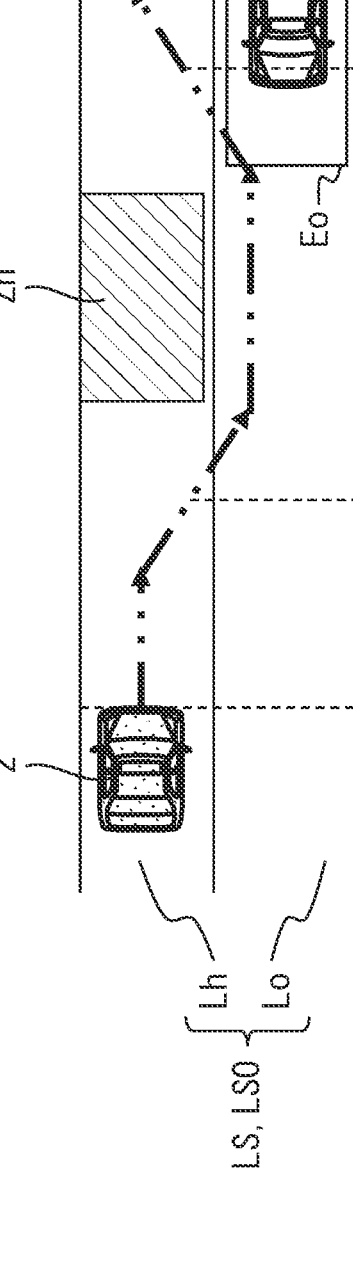
FIG. 13 is still yet another schematic diagram showing the obstacle avoidance scene to which one embodiment is applied.

When the overlapping section SDo is estimated, the control block 120 sets a safety envelope Eo as shown in FIGS. 12 and 13, for the target vehicle 3 which has stopped traveling in the monitoring section SMo. At this time, the stop of travel of the target vehicle 3 is recognized based on data obtained by at least one of the sensor system 5, the communication system 6, and the map DB 7.

In setting the safety envelope Eo for the target vehicle 3 that has been recognized to stop traveling, the control block 120 recognizes, as the safety envelope Eo, the range in which the target vehicle 3 and the host vehicle 2 are expected to secure a safety distance in both of the vertical and horizontal directions. At this time, the safety envelope Eo is set based on a safety model that follows the driving policy between the target vehicle 3 and the host vehicle 2, and is set without a constraint of the maximum allowable acceleration in the longitudinal direction assumed on a target vehicle 3 side.

The control block 120, which has set the safety envelope Eo for the target vehicle 3 in the stopped state, predicts whether or not the host vehicle 2 on the obstacle avoidance path Ph planned by the planning block 110 overlaps with the safety envelope Eo. Such a prediction may also be considered as processing for determining whether or not the host vehicle 2 on the obstacle avoidance path Ph passes through the safety envelope Eo.

Therefore, when a non-overlapping case is predicted in which the host vehicle 2 on the obstacle avoidance path Ph passes outside of the safety envelope Eo as shown in FIG. 12, the control block 120, in response to the stop of traveling of the target vehicle 3 in the monitoring section SMo, selects deviation control to the oncoming lane Lo. At this time, deviation control causes the host vehicle 2 to travel along the obstacle avoidance path Ph planned by the planning block 110.

Figure 14:
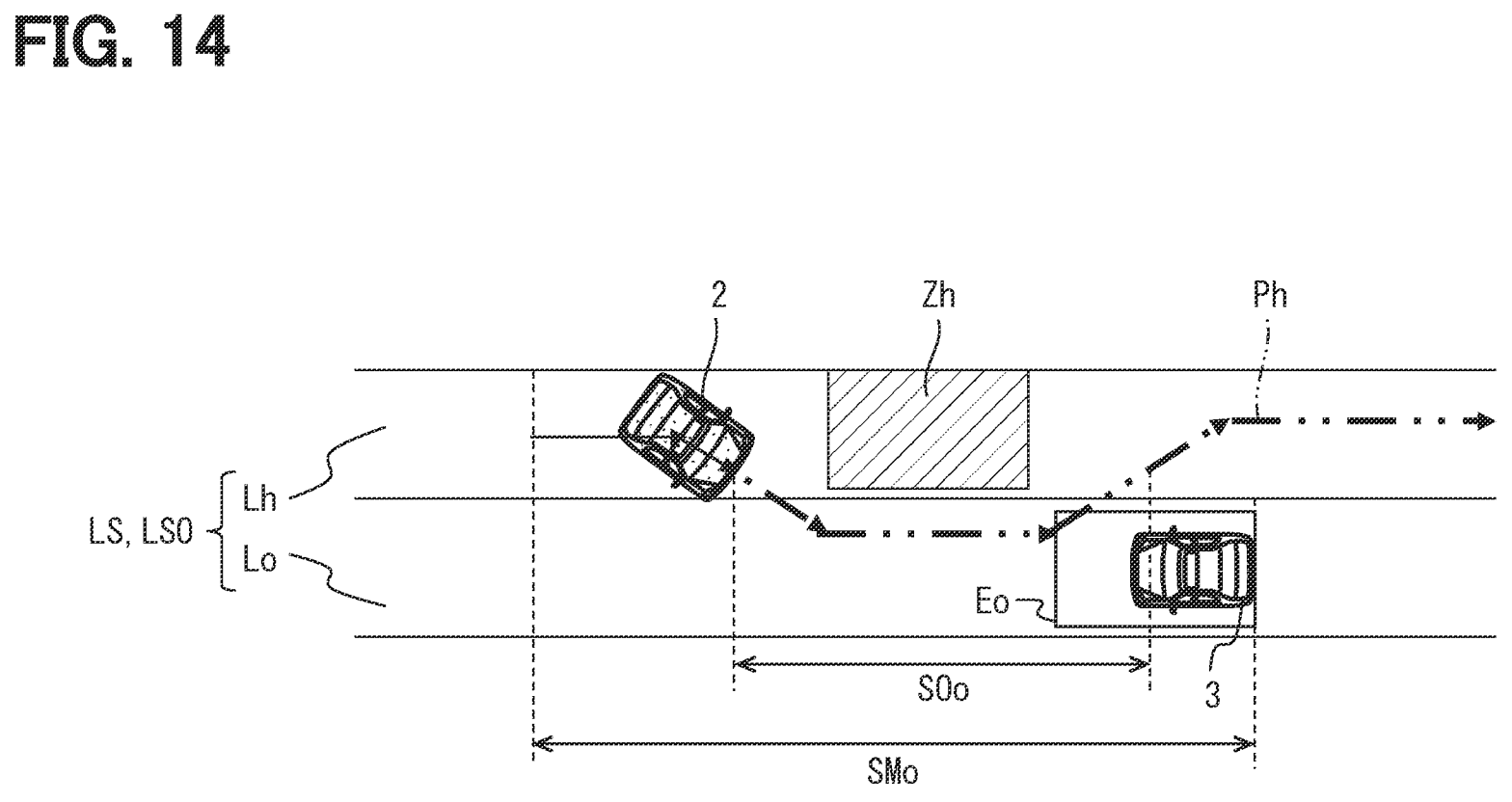

On the other hand, when an overlapping case in which the host vehicle 2 on the obstacle avoidance path Ph passes through the safety envelope Eo as shown in FIG. 13 is predicted, the control block 120 selects standby control in the host lane Lh, in response to the stop of travel of the target vehicle 3 in the monitoring section SMo. At this time, standby control causes the host vehicle 2 to stop traveling on the obstacle avoidance path Ph planned by the planning block 110. However, in standby control, the host vehicle 2 may be stopped as shown in FIG. 14 after traveling along the obstacle avoidance path Ph planned by the planning block 110 up to a position just before the deviation section SOo.

During standby control in the overlapping case in which both of the vehicles 2 and 3 stop traveling, a priority transfer notification is transmitted from the host vehicle 2 to the target vehicle 3 via the communication system 6. Therefore, standby control in the overlapping case is continued until the target vehicle 3, which has resumed traveling in response to the priority transfer notification, passes through the overlapping section SDo in the oncoming lane Lo. At this time, the passage of the overlapping section SDo by the target vehicle 3 is recognized based on data obtained from at least one of the sensor system 5, the communication system 6, and the map DB 7. Therefore, after selecting standby control in the overlapping case, the control block 120 selects deviation control to the oncoming lane Lo in response to passage of the target vehicle 3 through the overlapping section SDo. At this time, deviation control causes the host vehicle 2 to travel along the obstacle avoidance path Ph planned by the planning block 110.

Figure 15:
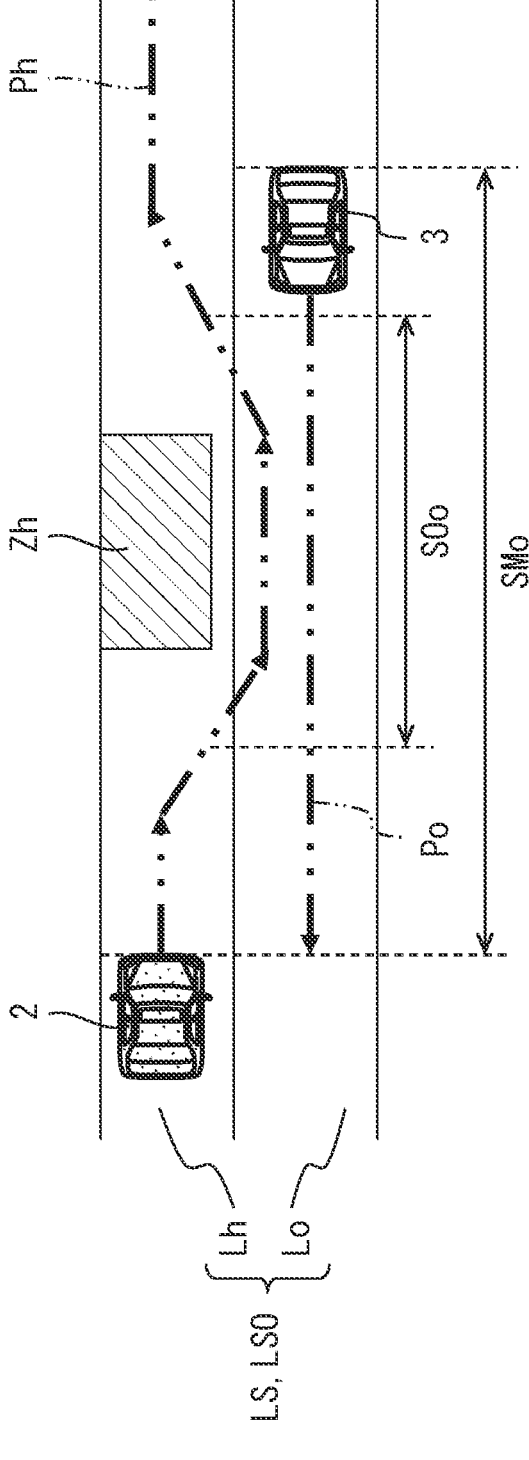
FIG. 15 is still yet another schematic diagram showing the obstacle avoidance scene to which one embodiment is applied.

Even when the overlapping section SDo is estimated, the control block 120 selects standby control in the host lane Lh in response to the target vehicle 3 continuing to travel in the monitoring section SMo. At this time, the continuation of travel of the target vehicle 3 is recognized based on data obtained by at least one of the sensor system 5, the communication system 6, and the map DB 7. Therefore, standby control causes the host vehicle 2 to stop traveling on the obstacle avoidance path Ph planned by the planning block 110, as shown in FIG. 15. However, in standby control, the host vehicle 2 may be stopped after traveling along the obstacle avoidance path Ph planned by the planning block 110 up to a position just before the deviation section SOo.

Standby control in response to continuation of travel of the target vehicle 3 continues until the target vehicle 3 passes through the overlapping section SDo of the oncoming lane Lo. At this time, the passage of the overlapping section SDo by the target vehicle 3 is recognized based on data obtained from at least one of the sensor system 5, the communication system 6, and the map DB 7. Therefore, after selecting standby control in response to continuation of travel of the target vehicle 3, the control block 120 selects deviation control to the oncoming lane Lo in response to the passage of the overlapping section SDo by the target vehicle 3. At this time, deviation control causes the host vehicle 2 to travel along the obstacle avoidance path Ph planned by the planning block 110.

During standby control in response to continuation of travel of the target vehicle 3, a case can be assumed in which the target vehicle 3 also stops traveling in the monitoring section SMo. In such case an assumed above, the control block 120 selects drive control by processing corresponding to the above-described case of the target vehicle 3 in the stopped state.

The overlapping travel situation estimated by the control block 120 also includes a situation in which an overlapping section SDo does not occur, that is, a situation in which the future travels of the vehicles 2 and 3 are estimated as non-overlapping. Therefore, the control block 120 selects deviation control to the oncoming lane Lo when it is estimated that the future travels of the vehicles 2 and 3 will not overlap as the overlapping travel situation. At this time, deviation control causes the host vehicle 2 to travel along the obstacle avoidance path Ph planned by the planning block 110.

When, in the transition avoidance scene, it is determined that the target vehicle 3 traveling in the oncoming lane Lo is not detected by the detection block 100, the control block 120 provides deviation control to the oncoming lane Lo for the host vehicle 2. At this time, deviation control causes the host vehicle 2 to travel along the obstacle avoidance path Ph planned by the planning block 110.

Figure 16:
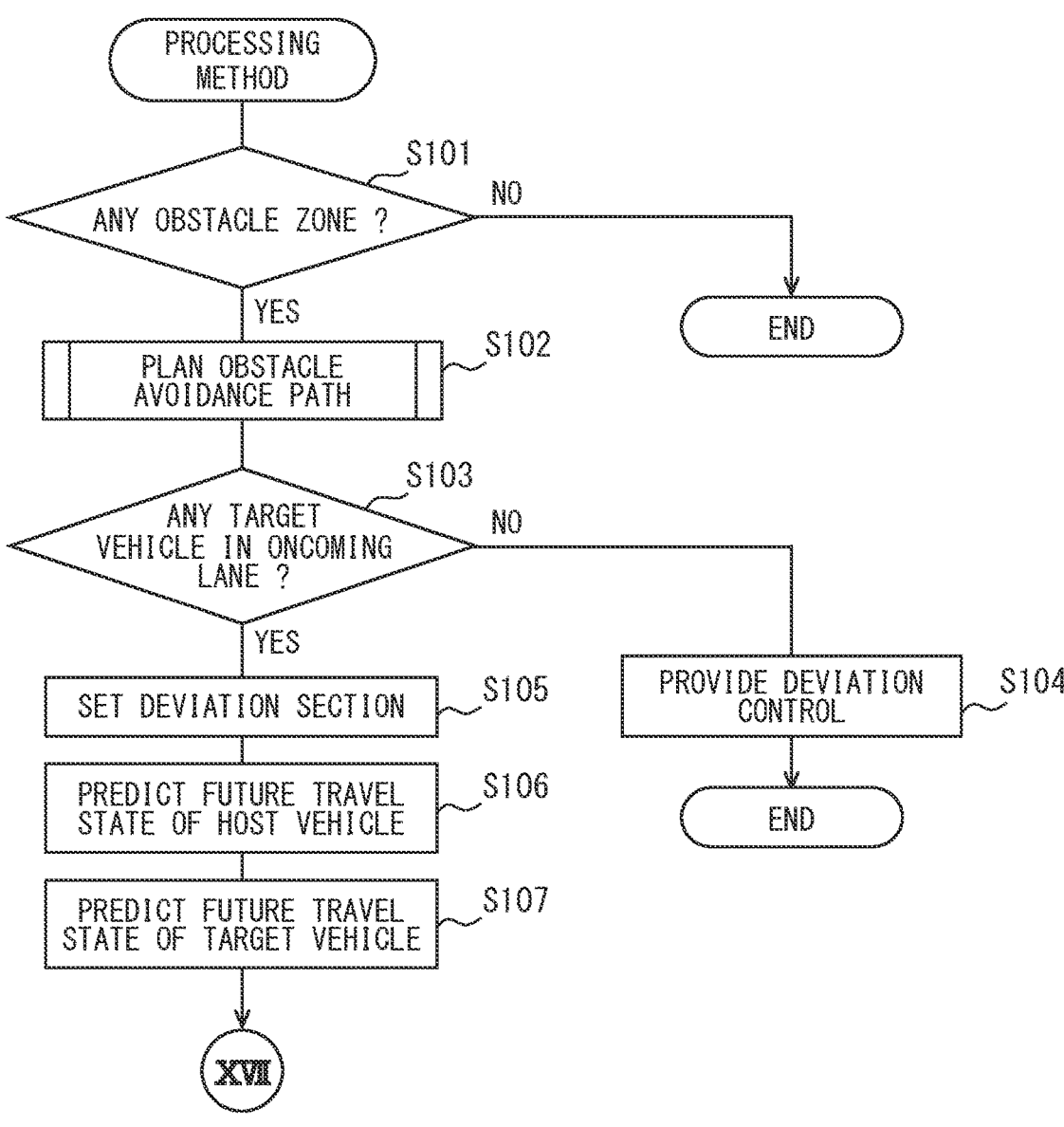
FIG. 16 is a flowchart showing a processing method according to one embodiment.
Figure 17:
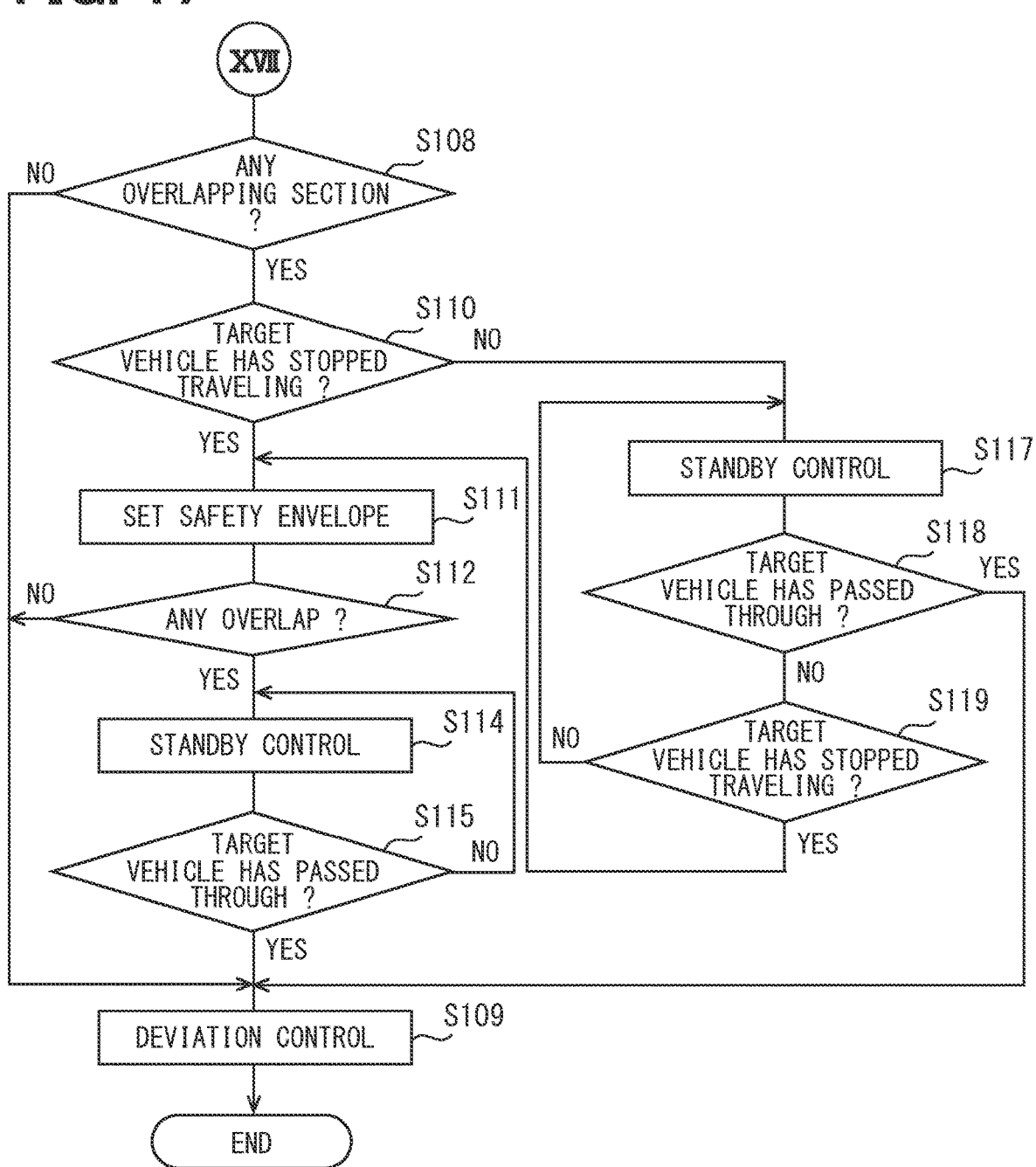
FIG. 17 is another flowchart showing the processing method according to one embodiment.

By the cooperation of the blocks 100, 110, and 120 thus far described, a flow of the processing method by which the processing system 1 performs drive-related processing, is repeated during an activation time of the host vehicle 2 as shown in FIGS. 16 to 18. Note that, in the following description, "S" in the processing method indicates a step executed by an instruction included in a processing program.

In a flow shown in FIG. 16, in S101, the detection block 100 determines whether there is an obstacle zone Zh in the host lane Lh. As a result, when a negative determination is made, the current execution of the flow ends. On the other hand, when an affirmative determination is made, the flow shifts to S102.

In S102, the planning block 110 executes a planning subroutine to plan an obstacle avoidance path Ph. In the planning subroutine shown in FIG. 18, the planning block 110 sets the lateral displacement completion position Xe in S201. In S202, the planning block 110 sets the required lateral movement amount Ml. In S203, the planning block 110 sets the required steering distance Ns. In S204, the planning block 110 sets the lateral displacement start position Xs. In S205, the planning block 110 generates an obstacle avoidance path Ph passing through the lateral displacement start position Xs and the lateral displacement completion position Xe.

In S103 of the flow shown in FIG. 16, the detection block 100 determines whether or not there is a target vehicle 3 traveling in the oncoming lane Lo. As a result, when a negative determination is made, the flow shifts to S104. In S104, the control block 120 provides the host vehicle 2 with deviation control to the oncoming lane Lo, for avoiding the obstacle zone Zh by a travel along the obstacle avoidance path Ph planned in S102.

When an affirmative determination is made in S103, the flow shifts to S105. In S105, the control block 120 sets the deviation section SOo of the host vehicle 2 from the host lane Lh in the oncoming lane Lo. In S106, the control block 120 predicts, as the future travel state of the host vehicle 2, a drive control state that follows the obstacle avoidance path Ph in the deviation section SOo set in S105. In S107, the control block 120 predicts, as the future travel state of the target vehicle 3, (i) an oncoming travel path Po predicted for the target vehicle 3 in the deviation section SOo set in S105, and (ii) a drive control state following such a path Po.

In S108 of the flow shown in FIG. 17, the control block 120 determines, as the overlapping travel situation of the vehicles 2 and 3, whether there is an overlapping section SDo in which the future travels of the vehicles 2 and 3 for which drive control states in the deviation section SOo are predicted in S106 and S107 overlap with each other. As a result, when a negative determination is made, the flow shifts to S109. In S109, the control block 120 selects deviation control to the oncoming lane Lo, which avoids the obstacle zone Zh along the obstacle avoidance path Ph planned in S102, as the drive control to be provided to the host vehicle 2.

When an affirmative determination is made in S108, the flow shifts to S110. In S110, the control block 120 determines whether or not the target vehicle 3 has stopped traveling in the monitoring section SMo of the oncoming lane Lo. As a result, when an affirmative determination is made in response to the stop of the target vehicle 3, the flow shifts to S111. In S111, the control block 120 sets the safety envelope Eo for the target vehicle 3 that has stopped traveling. In S112, the control block 120 determines whether or not the safety envelope Eo set at S111 overlaps with the host vehicle 2 on the obstacle avoidance path Ph planned in S102. As a result, when the host vehicle 2 on the obstacle avoidance path Ph is predicted to pass outside the safety envelope Eo, leading to a negative determination in S112, the flow proceeds to S109 described above.

On the other hand, when the host vehicle 2 on the obstacle avoidance path Ph is predicted to pass through the safety envelope Eo, leading to an affirmative determination in S112, the flow proceeds to S114. In S114, the control block 120 selects standby control in the host lane Lh to stop on the obstacle avoidance path Ph planned in S102, as the drive control to be provided to the host vehicle 2. In S115, the control block 120 determines whether or not the target vehicle 3, which has resumed travel after selecting standby control, has passed through the overlapping section SDo. As a result, when a negative determination is made in S115, the flow returns to S114. Thereafter, in response to the passage of the target vehicle 3 through the overlapping section SDo, leading to an affirmative determination in S115, the flow shifts to above-described S109.

Now, in above-described S110, when a negative determination is made in response to continuation of travel of the target vehicle 3, the flow shifts to S117. In S117, the control block 120 selects standby control in the host lane Lh to stop on the obstacle avoidance path Ph planned in S102 as the drive control to be provided to the host vehicle 2. In S118, the control block 120 determines whether or not the target vehicle 3, which continues to travel after the selection of standby control, has passed through the overlapping section SDo.

If a negative determination is made in S118, the flow shifts to S119. In S119, the control block 120 determines whether or not the target vehicle 3 has stopped traveling in the monitoring section SMo. As a result, when an affirmative determination is made, the flow shifts to above-described S111. On the other hand, when a negative determination is made, the flow returns to S117. Thereafter, when the target vehicle 3 passes through the overlapping section SDo and an affirmative determination is made in S118, the flow shifts to above-described S109.

According to the present embodiment described above, in the obstacle avoidance scene in which the host vehicle 2 avoids, by deviating into the oncoming lane Lo, the obstacle zone Zh that hinders the host vehicle 2 from traveling in the host lane Lh which has the oncoming lane Lo running in parallel, processing related to the drive of the host vehicle 2 is performed. In such drive-related processing, when it is determined that the target vehicle 3 traveling in the oncoming lane Lo has been detected, according to the overlapping travel situation in which the future travels of the host vehicle 2 and the target vehicle 3 overlap with each other in the oncoming lane, the drive control to be provided to the host vehicle 2 is selected. According to the above, it is possible to appropriately prioritize (a) deviation control to the oncoming lane Lo to avoid the obstacle zone Zh or (b) standby control in the host lane Lh to delay the avoidance of the obstacle zone Zh, according to the overlapping travel situation. Therefore, an appropriate coping with an obstacle avoidance scene would be suitably facilitatable.

Although one embodiment has been described in the above, the present disclosure is not to be construed as being limited to the above-described embodiment, and the present disclosure can be applied to various embodiments and combinations within the scope thereof.

The dedicated computer constituting the processing system 1 in a modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The planning block 110 and S203 in a modification example may set the required steering distance Ns without any lateral acceleration limitation. The control block 120 and S107 in a modified example may predict the drive control state of the target vehicle 3 based on the maximum allowable acceleration without a constraint on the allowable upper speed limit, as shown in FIG. 19. The control block 120 and S107 in a modified example may predict the drive control state of the target vehicle 3 without a constraint on the allowable upper speed limit and the maximum allowable acceleration. The control block 120 and S111 in a modified example may set the safety envelope Eo with a constraint of the maximum allowable acceleration assumed for the target vehicle 3.

What is claimed is:

1. A processing method performed by a processor for executing a process related to driving of a host mobile object in an obstacle avoidance scene where the host mobile object avoids an obstacle zone that interferes with travelling of the host mobile object by deviating from a host lane to an oncoming lane, the processing method comprising steps of:

monitoring a target mobile object traveling in the oncoming lane; and upon determining that the target mobile object traveling in the oncoming lane is detected, giving, as a drive control, to the host mobile object according to an overlapping travel situation where a future travel of the host mobile object and a future travel of the target mobile object would overlap with each other in the oncoming lane, either (i) deviation control for the host mobile object to deviate from the host lane to the oncoming lane, or (ii) standby control for the host mobile object to stay in the host lane; and planning an obstacle avoidance path to give the host mobile object the deviation control from the host lane to the oncoming lane such that an assumed acceleration of the host mobile object in a lateral direction is restricted, wherein giving the host mobile object the drive control includes:

(a)

(i) setting a safety envelope for the target mobile object that travels in the oncoming lane with a restriction/constraint of an assumed maximum acceleration for the target mobile object, and (ii) setting another safety envelope for the target mobile object that has stopped traveling in the oncoming lane without the restriction/constraint when an overlapping section where the future travel of the host mobile object and the future travel of the target mobile object would overlap with each other is estimated; and (b) selecting the deviation control to deviate from the host lane to the oncoming lane along the obstacle avoidance path in response to detecting that the target mobile object stops traveling in the oncoming lane when the host mobile object on the obstacle avoidance path is predicted to pass through a point outside of the safety envelope without the restriction/constraint.

2. The processing method according to claim 1, further comprising estimating the overlapping travel situation between the host mobile object and the target mobile object for which the future travel is predicted based on an assumed maximum acceleration of the target mobile object.

3. The processing method according to claim 2, further comprising:

estimating the overlapping travel situation between the host mobile object and the target mobile object for which the future travel is predicted based on the assumed maximum acceleration and an assumed upper limit speed of the target mobile object.

4. The processing method according to claim 1, wherein giving the host mobile object the drive control includes selecting the deviation control to deviate from the host lane to the oncoming lane along the obstacle avoidance path when the future travel of the host mobile object and the future travel of the target mobile object are determined not to overlap with each other.

5. The processing method according to claim 1, wherein giving the host mobile object the drive control includes selecting the standby control to stay in the host lane in response to detecting continuation of traveling by the target mobile object in the oncoming lane when an overlapping section where the future travel of the host mobile object and the future travel of the target mobile object would overlap with each other is estimated.

6. The processing method according to claim 1, wherein giving the host mobile object the drive control includes selecting the standby control to stay in the host lane in response to detecting that the target mobile object stops traveling in the oncoming lane when the host mobile object on the obstacle avoidance path is predicted to pass through the safety envelope.

7. The processing method according to claim 5, wherein giving the host mobile object the drive control includes selecting the deviation control to deviate from the host lane to the oncoming lane along the obstacle avoidance path in response to detecting that the target mobile object passes through the overlapping section after selecting the standby control to stay in the host lane.

8. The processing method according to claim 1, further comprising:

giving the host mobile object the deviation control from the host lane to the oncoming lane along the obstacle avoidance path when the target mobile object traveling in the oncoming lane is determined not to be detected.

9. A processing system having a processor and executing a process related to driving of a host mobile object in an obstacle avoidance scene where the host mobile object avoids an obstacle zone that interferes with travelling of the host mobile object by deviating from a host lane to an oncoming lane, the processing system comprising the processor that is configured to:

monitor a target mobile object traveling in the oncoming lane; and upon determining that the target mobile object traveling in the oncoming lane is detected, give, as a drive control, to the host mobile object according to an overlapping travel situation where a future travel of the host mobile object and a future travel of the target mobile object would overlap with each other in the oncoming lane, either (i) deviation control for the host mobile object to deviate from the host lane to the oncoming lane, or (ii) standby control for the host mobile object to stay in the host lane; and plan an obstacle avoidance path to give the host mobile object the deviation control from the host lane to the oncoming lane such that an assumed acceleration of the host mobile object in a lateral direction is restricted, wherein giving the host mobile object the drive control includes:
  (a)
    (i) setting a safety envelope for the target mobile object that travels in the oncoming lane with a restriction/constraint of an assumed maximum acceleration for the target mobile object, and
    (ii) setting another safety envelope for the target mobile object that has stopped traveling in the oncoming lane without the restriction/constraint when an overlapping section where the future travel of the host mobile object and the future travel of the target mobile object would overlap with each other is estimated; and
  (b) selecting the deviation control to deviate from the host lane to the oncoming lane along the obstacle avoidance path in response to detecting that the target mobile object stops traveling in the oncoming lane when the host mobile object on the obstacle avoidance path is predicted to pass through a point outside of the safety envelope without the restriction/constraint.

10. A non-transitory, computer readable, tangible storage medium storing instructions executable by a processor as a computer-readable processing program for executing a process related to driving of a host mobile object in an obstacle avoidance scene where the host mobile object avoids an obstacle zone that interferes with travelling of the host mobile object by deviating from a host lane to an oncoming lane, the instructions, when executed by the processor, casing the processor to perform:

monitoring a target mobile object traveling in the oncoming lane; and upon determining that the target mobile object traveling in the oncoming lane is detected, giving, as a drive control, to the host mobile object according to an overlapping travel situation where a future travel of the host mobile object and a future travel of the target mobile object would overlap with each other in the oncoming lane, either (i) deviation control for the host mobile object to deviate from the host lane to the oncoming lane, or (ii) standby control for the host mobile object to stay in the host lane; and planning an obstacle avoidance path to give the host mobile object the deviation control from the host lane to the oncoming lane such that an assumed acceleration of the host mobile object in a lateral direction is restricted, wherein giving the host mobile object the drive control includes:
  (a)
    (i) setting a safety envelope for the target mobile object that travels in the oncoming lane with a restriction/constraint of an assumed maximum acceleration for the target mobile object, and
    (ii) setting another safety envelope for the target mobile object that has stopped traveling in the oncoming lane without the restriction/constraint when an overlapping section where the future travel of the host mobile object and the future travel of the target mobile object would overlap with each other is estimated; and
  (b) selecting the deviation control to deviate from the host lane to the oncoming lane along the obstacle avoidance path in response to detecting that the target mobile object stops traveling in the oncoming lane when the host mobile object on the obstacle avoidance path is predicted to pass through a point outside of the safety envelope without the restriction/constraint.

* * * * *